May 5, 1964   N. C. FLOYD   3,131,848
CONTAINER
Filed Nov. 1, 1961   2 Sheets-Sheet 1
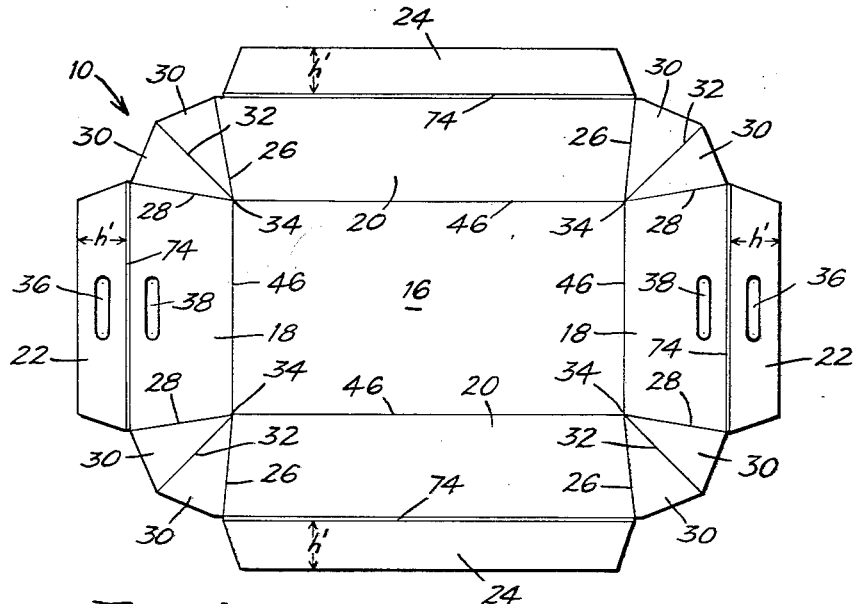
Fig. 1
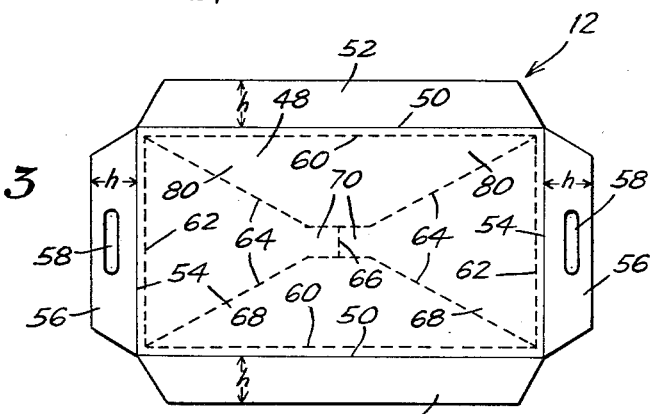
Fig. 3
Fig. 2
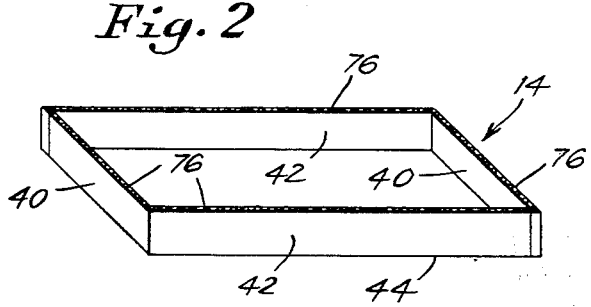
INVENTOR
Norris C. Floyd,
BY Diggins + LeBlanc
ATTORNEYS May 5, 1964 N. C. FLOYD 3,131,848
CONTAINER
Filed Nov. 1, 1961 2 Sheets-Sheet 2

INVENTOR
Norris C. Floyd,

BY Diggins & Le Blanc
ATTORNEYS

United States Patent Office 3,131,848
Patented May 5, 1964

3,131,848
CONTAINER
Norris C. Floyd, Muncie, Ind., assignor to Builders Paving Co., Inc., Muncie, Ind., a corporation of Indiana
Filed Nov. 1, 1961, Ser. No. 149,471
15 Claims. (Cl. 229—31)

This invention relates to containers and, more particularly, to waterproof containers which are especially adapted for use in connection with "do-it-yourself" mixing of cement, mortar and the like.

Numerous "do-it-yourself" kits are presently on the market for making cement, concrete, mortar and the like. In such kits, a dry mix (i.e., of cement) is packaged in a waterproof container which is adapted to receive water or other fluid which is then mixed with the cement directly in the container. In the usual case, the container comprises a flexible package which is adapted to be kneaded after the water or other fluid has been added until such time as a substantially homogeneous mixture of the dry mix and the water is obtained.

While such kits have met with a modicum of commercial success, their use is attendant with various difficulties. For example, it is extremely difficult in the use of such kits to obtain a truly homogeneous mixture of the dry mix and the liquid and then, only after much effort has been expended. Furthermore, such kits are extremely bulky, especially where a dry mix such as cement, concrete or mortar is concerned, and cannot be readily handled by the do-it-yourself operator.

The container of the present invention is particularly suitable for do-it-yourself jobs such as those described above but its use does not involve any of the difficulties associated with kits such as are presently on the market. It is accordingly a principal object of the present invention to provide a waterproof container particularly suitable for do-it-yourself preparation of a wet mixture of cement, concrete, mortar and the like.

It is a further object of the present invention to provide a novel, waterproof container which may be readily and inexpensively fabricated and which is particularly adaptable to the do-it-yourself preparation of cement, concrete, mortar and the like.

It is still another object of the present invention to provide a novel, waterproof container which may be fabricated from two ;or at most three structural elements and which may be used for the do-it-yourself preparation of cement, concrete, mortar and the like, without the attendant homogeneity problems of currently available containers.

It is a still further object of the present invention to provide a container for a dry mixture of cement, concrete, mortar or the like, which is compact, well constructed and easily transported.

These and other objects and advantages of the present invention will become more apparent as reference is made to the ensuing description, claims and drawings, wherein:

FIGURE 1 represents a developed view of the compartment member of the novel container of the present invention;

FIGURE 2 is a perspective view of a stiffener used in conjunction with the container of the present invention;

FIGURE 3 is a developed view of a perforated closure used in connection with the container of the present invention;

Figure 4:
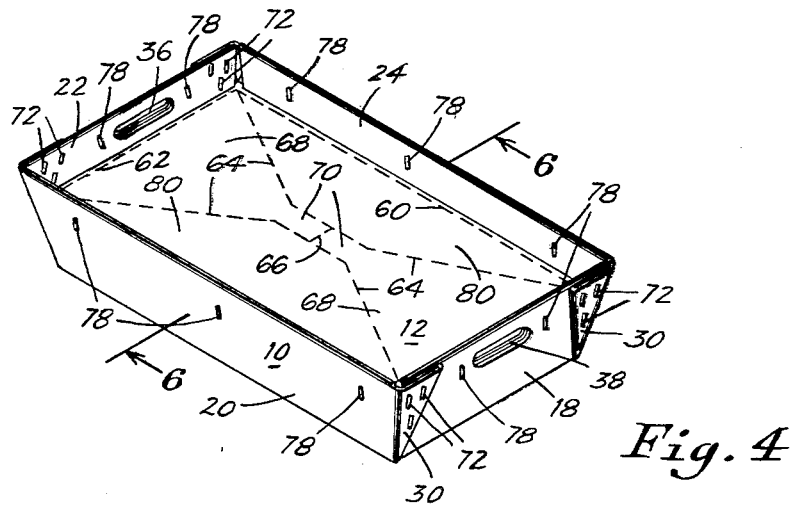
FIGURE 4 is an isometric view of the container of the present invention, fully assembled.
Figure 5:
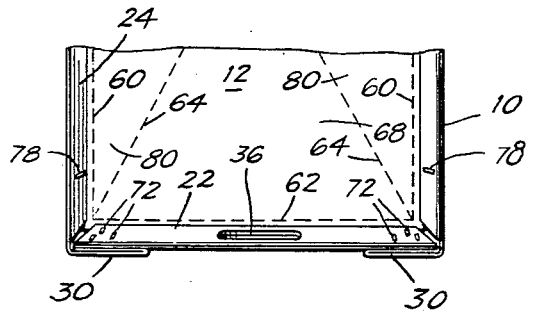
FIGURE 5 is a partial top plan view of the container of the present invention when fully assembled, illustrating the manner in which the container walls are secured together.
Figure 6:
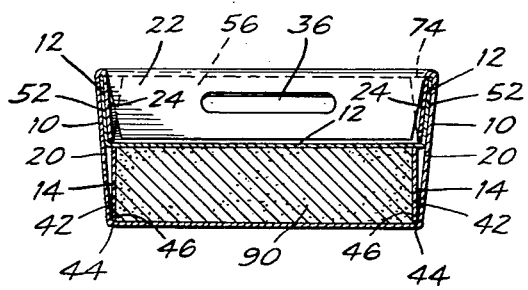
FIGURE 6 is a vertical section taken along line 6—6 of FIGURE 4.

As best shown in FIGURES 4 and 6, the novel container of the present invention comprises three essential elements, a main compartment member 10, a closure 12 and a stiffener 14.

Compartment member 10 is constructed of a single sheet of material, which is preferably a waterproof, corrugated cardboad, and comprises a rectangular base 16, two end walls 18 and two side walls 20. Each of the end walls 18 has a reinforcing extension flap 22 which, as shown in FIGURE 4, extends down only partway along end wall 18 when flaps 22 are folded down about the end walls. Similarly, side walls 20 are provided with reinforcing flaps 24 which also extend only partway down the former when flaps 24 are bent inwardly to overlay the side walls.

As shown in FIGURE 1, the lateral edges 26 of each of the side walls 20 form an acute angle with each of the lateral edges 28 of the end walls 18 for a purpose to be described below. Each lateral edge 26 of side walls 20 is connected to lateral edges 28 of end walls 18 by means of two isosceles triangle segments 30 which have one common leg 32 and a common apex 34 which also forms the corner of base 16.

Reinforcing flaps 22 and end walls 18 are provided respectively with slots 36 and 38, said slots being so arranged with respect to one another that when reinforcing flaps 22 are folded over end walls 18, the slots 36 and 38 at each end of the compartment member will be coincident.

Stiffener element 14 is a rectangularly shaped frame having vertically extending end walls 40 and side walls 42. The perimetrical dimensions of stiffener 14 are slightly less than those of base 16 of compartment member 10 so that when walls 18 and 20 of the latter are raised towards one another to form the container of the present invention, the bottom edges 44 of stiffener 14 will substantially abut the bottom edges 46 of walls 18 and 20 (see FIGURE 6). The height of stiffener 14 is approximately equal to the distance separating closure 12 and base 16 of compartment member 10 in the assembled condition of the container (see FIGURE 6).

Closure 12 (see FIGURE 3) comprises a main body portion 48 which is of rectangular configuration, the longitudinal edges 50 of said main body portion having laterally projecting extension flaps 52. Similarly, the edges 54 of closure 12 are provided with laterally projecting extension flaps 56, which projections are provided with slots 58.

Main body portion 48 of closure 12 is perforated in the manner shown in FIGURE 3, the perforations 60 along the longitudinal edges 50 of the main body portion being slightly displaced therefrom and the perforations 62 along the edges 54 of main body portion 48 also being slightly displaced therefrom. As will be seen in FIGURE 3, perforations 64 and 66 are so designed that when the main body portion 48 is split along those perforations, two generally triangular sections 68 will be formed, each having a tab 70 for a purpose to be described below.

The dimension "$h$" of each of flaps 52 and 56 are approximately equal to the dimension "$h'$" of flaps 22 and 24 of compartment member 10. The dimensions of main body portion 48 of closure 12 are approximately those of a horizontal section of the assembled compartment member 10 taken along a plane in which closure 12 is positioned in the assembled container (see FIGURE 4).

To assemble the container of the present invention, each of the walls 18 and 20 of compartment member 10 are bent upwardly about their lower edges 46 until the lateral edges 26 and 28 of each adjacent pair of walls abut one another. As walls 18 and 20 are bent upwardly in this manner, each pair of triangle segments 30—30 will bend downwardly about their legs 26 and 28, the simultaneous bending of common leg 32 of each pair of triangle segments 30—30 permitting them to execute this bending movement. When lateral edges 26 and 28 of the walls 18 and 20 abut one another in the manner above described, one of the triangle segments 30 in each pair of triangle segments 30—30 will be positioned with its upper surface (viewing such triangle segments as they are seen in FIGURE 1) lying flush against the upper surface of the other triangle segment 30 in said pair, both of said triangle segments being positioned, however, outside of the enclosure formed by the abutting walls 18 and 20. Each pair of triangle segments 30—30 is then bent along its legs 26—28 so that it overlies end walls 18 as shown in FIGURE 4, at which time the triangle segments are secured to end walls 18, as by staples 72.

Stiffener element 14 is then placed inside of the thus assembled compartment member 10 so that its lower edges 44 lie immediately adjacent edges 46 of base 16 of compartment member 10, as may be seen more particularly in FIGURES 4 and 6. Extension flaps 22 and 24 on compartment member 10 are then bent inwardly toward the center of the compartment member about their lower edges 74 to a point at which they abut the upper surface of walls 18 and 20 (i.e., see FIGURE 4). At this point, the container thus assembled is filled with the material to be packed into the container (i.e., with cement 90) to a point approximately level with with the top edge 76 of stiffener 14.

Extension flaps 52 and 56 of closure 12 are then bent upwardly and outwardly about the respective lower edges 50 and 54 of said flaps. Flaps 52 are then placed under folded flaps 24 of compartment member 10, as shown in FIGURE 6, and at the same time, flaps 56 are similarly placed under folded flaps 22. Extension flaps 52 and 56 are then secured in place respectively between flaps 24 and 22 and the upper portion of each of walls 20 and 18 respectively, as by staples 78. As will be apparent, slots 58 in flaps 56 of closure 12 are positioned in such a manner as to be coincident with slots 36 and 38 in flaps 22 and 18 respectively of compartment member 10. The full container is then ready for use.

When it is desired to use the novel container of the present invention for mixing concrete, cement, mortar, or the like which is packaged in the container, closure 12 is opened by cutting along perforated lines 64 and 66. As will be apparent, when this has been accomplished, triangular portions 68 in closure 12 may be pulled up away from the remaining portions of the closure (they will pivot about perforated lines 62) and triangular portions 80 may be similarly pulled upwardly away from the closure (they will pivot about perforated lines 60). If desired, each of triangular portions 68 and 80 may be severed from the remaining portion of closure 12 by severing them along perforated lines 60 and 62. Alternatively, only triangular portions 80 need be severed from closure 12, it being sufficient with respect to triangular portions 68 to pull them upwardly and back toward the slotted ends of the container and to place tabs 70 in the slots (36—38—58) in which they will be held during the mixing operation.

Since compartment member 10 is of unitary construction, water or other liquid may be added directly to the dry mix in the container without running the risk of leakage. To further insure against leakage, it may be desirable to waterproof the container by conventional techniques. After mixing has been accomplished, the wet mix may be removed from the container and the container discarded.

To facilitate bending of the various sections of the container of the present invention, it is desirable to score the various elements of the container along lines at which bending is required. As will be apparent, it is not essential that perforations be provided along lines 60 and 62 of closure 12, it being sufficient if the closure is scored to facilitate bending along these lines.

The advantages of the container of the present invention are many and varied. First, the inclined walls of the container not only gives added support to closure 12 to resist downward forces on the closure but permits the lower edges 44 of stiffener 14 to lie in substantially abutting relationship to the edges 46 of the bottom 16 of compartment member 10 (to secure the stiffener firmly in place against lateral movement) while permitting the top edges 76 of stiffener 14 to lie inwardly disposed of perforations 60 and 62 of closure 12 to give added support to the closure. This last mentioned feature is important since it is desirable to position perforations 60 and 62 as close to the edges 50 and 54 of main body portion 48 of the closure so as to avoid any significant overhang when triangular portions 68 and 80 are removed from the closure. The recessed top portion of the container leaves apertures 36, 38 and 58 unobstructed so that the container may be readily hand carried. The one piece construction of the main compartment member 10 makes possible the wet mixing of the ingredients of the container directly in the container without fear of leakage. Furthermore, the fact that the compartment member 10 and closure 12 are completely developable makes possible the convenient transportation of the container in knocked-down condition. As is apparent, the container may be fabricated both simply and inexpensively and provides an exceptionally suitable means for the sale of dry mixes in bulk form.

As will be apparent, the container of the present invention may be used for transporting materials other than those mentioned previously, concrete, cement and mortar having been mentioned merely by way of illustration and not by way of limitation.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A container comprising a compartment having two end walls, two side walls and a bottom; all of said walls being inclined outwardly so that the perimeter of the top edge of the compartment walls is larger than that of the bottom edge of said compartment walls; the walls of said compartment being turned upon themselves along their topmost edges towards the inside of said compartment to form inwardly directed flaps extending only partly down said walls; a closure for said compartment having two side edges and two end edges; each of said closure edges having an upwardly and outwardly inclined flap; each of the two side closure flaps being fastened between one of the side wall flaps and the top portion of the side wall adjacent said side wall flap; each of the two end closure flaps being fastened between one of the end wall flaps and the top portion of the end wall adjacent said end wall flap; said closure being positioned intermediate the top and bottom edges of said walls, whereby a closed compartment is formed between said closure, the bottom of said compartment and the lower portions of said compartment walls, and a recess being formed between said closure and the upper portions of said compartment walls, the perimetrical configuration of said closure being substantially the same as the configuration of a horizontal section of the compartment walls taken along the plane in which said closure lies, whereby the inclined walls of said compartment will resist downward movement of the closure, said closure being perforated close to but slightly inwardly spaced from at least two of its opposite edges and stiffener means positioned between the bottom of the compartment and the closure for resisting a downward force on said closure between the perforations and the center of the closure.

2. A container as defined in claim 1 wherein said stiffener means comprises a four-sided, closed frame having vertically disposed walls of a height approximately equal to the distance separating said closure and compartment bottom; said frame having perimetrical dimensions approximately equal to those of the bottom of said compartment.

3. A container as defined in claim 2 wherein the topmost edges of said frame lie slightly inwardly disposed of said perforations in said closure.

4. A container as defined in claim 1 wherein at least two opposite walls of said compartment, the wall flaps partly overlying them and the closure flaps between them are apertured to provide hand grips; the recessing of said closure below the top edges of said compartment walls providing unobstructed access to said hand grips.

5. A container as defined in claim 2 wherein said closure is further perforated to permit it to be opened by tearing along said further perforations and pulling the closure portions bounded thereby away from the remaining closure portion; said further perforations being arranged so that each of said bounded closure portions presents a tab which is insertable in one of said apertures forming said hand grips to secure it in open position.

6. A container as defined in claim 5 wherein said compartment is formed of a single sheet of material which is completely developable on a plane.

7. A container as defined in claim 1 wherein said compartment is formed of a single sheet of material which is completely developable on a plane.

8. A container as defined in claim 7 wherein each of said compartment walls is connected to its adjacent compartment wall by means of two adjacent isosceles triangle segments; said triangle segments having a common apex located at the bottom of said compartment; the legs of said triangle segments having a length equal to that of the laterally extending edges of said compartment walls.

9. A container as defined in claim 8 wherein one triangle segment of each pair of said triangle segments lies over the other triangle in said pair; both of the triangle segments in each pair being secured to the outer surface of one of said compartment walls.

10. A container comprising a compartment having walls and a bottom; said compartment walls being inclined outwardly, whereby the perimeter of the top edge of the compartment walls is larger than that of the bottom edge of said compartment walls, said walls being turned upon themselves along their topmost edges towards the inside of said compartment to form inwardly directed flaps extending only partly down said walls; a closure for said compartment having a number of edges equal to the number of walls of said compartment; each of said closure edges having an extension flap; each of said extension flaps being fastened between one of the wall flaps and the top portion of the compartment wall adjacent said flap; said closure being positioned intermediate the top and bottom edges of said walls, whereby a closed compartment is formed between said closure, the bottom of said compartment and the lower portions of said compartment walls, and a recess being formed between said closure and the upper portions of said compartment walls, the perimetrical configuration of said closure being substantially the same as the configuration of a horizontal section of said compartment walls taken along the plane in which said closure lies, whereby the inclined walls of said compartment resist downward movement of said closure.

11. A compartment as defined in claim 10 wherein at least one wall of said compartment, the flap partly overlying it and the extension flap between them are apertured to provide a hand grip, the recessing of said closure below the top edges of said compartment walls providing unobstructed access to said hand grip.

12. A container as defined in claim 10 wherein said compartment is formed of a single sheet of material which is completely developable on a plane.

13. A container as defined in claim 12 wherein each of said compartment walls is connected to its adjacent compartment wall by means of two adjacent isosceles triangle segments; said triangle segments having a common apex located at the bottom of said compartment; the legs of said triangle segments having a length equal to that of the laterally extending edges of said compartment walls.

14. A container as defined in claim 13 wherein one triangle segment of each pair of said triangle segments lies over the other triangle segment in said pair; both of the triangle segments in each pair being secured to the outer surface of one of said compartment walls.

15. A container as defined in claim 10 wherein said closure is perforated close to but slightly inwardly spaced from at least two of its opposite edges; and additionally including stiffener means for resisting a downward force on said closure between said perforations and the center of said closure.

References Cited in the file of this patent

UNITED STATES PATENTS

| | | |
|---|---|---|
| 1,725,527 | Kondolf | Aug. 20, 1929 |
| 2,349,088 | Guyer | May 16, 1944 |
| 2,363,861 | Goodyear | Nov. 28, 1944 |
| 2,954,914 | Herlihy | Oct. 4, 1960 |

FOREIGN PATENTS

| | | |
|---|---|---|
| 366,194 | Great Britain | Feb. 4, 1932 |